J. R. RUSBY.
CLOTHES-DRIER.

No. 176,814. Patented May 2, 1876.

Witness
A. S. Cross
Frank Schoonmaker

Inventor
Joseph R. Rusby
By Horace Harris
Atty

UNITED STATES PATENT OFFICE.

JOSEPH R. RUSBY, OF BLOOMFIELD, NEW JERSEY.

IMPROVEMENT IN CLOTHES-DRIERS.

Specification forming part of Letters Patent No. 176,814, dated May 2, 1876; application filed March 1, 1876.

*To all whom it may concern:*

Be it known that I, JOS. R. RUSBY, of Bloomfield, in the county of Essex and State of New Jersey, have invented a certain Improvement in Clothes-Driers, of which the following is a specification:

My invention consists in the novel mode employed for supporting the radial arms of a clothes-drier.

Figure 2:
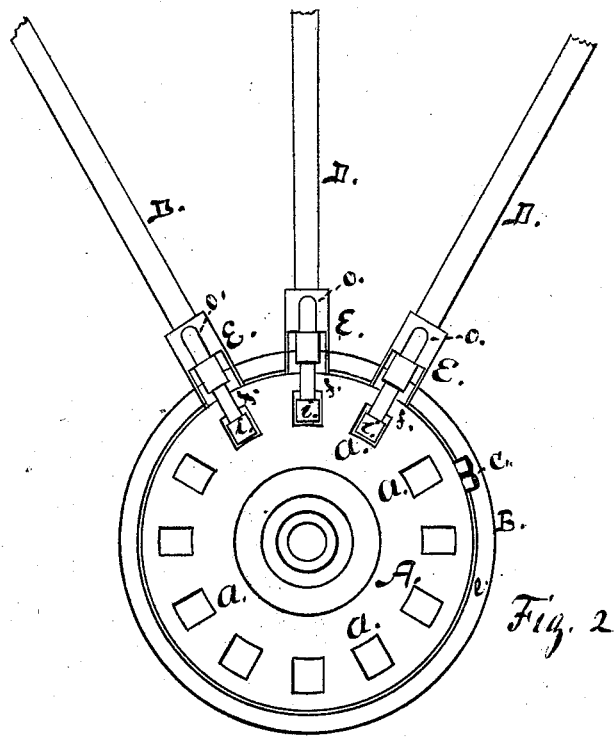
Figure 1:
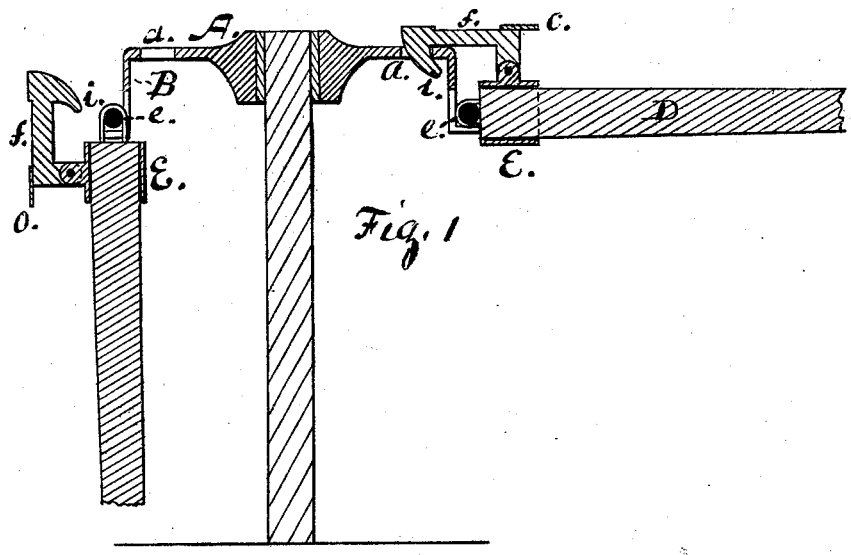

Figure 1 is a sectional elevation, and shows one arm down and one extended. Fig. 2 is a plan.

The plate A is constructed with the flange B and lips C, and with the rounded upper edge and the holes $a$ in the top. The arms D slip into a cap or socket, E, which, by a hole in it, is slipped onto the wire $e$, passing around the plate above the flange, and is held in place by passing through the lips C. The arms swing on this wire. To the upper side of this socket is jointed a dog, $f$, which extends out beyond the inner end of the socket. This dog is made with a hook, $i$, on the under side, and the end beveled or rounded from below.

When the arm is down—not in use—the hook may drop against the side of the plate; but, when desirable to use the drier, the arm is raised, and the dog readily adjusts itself, as the rounded end slips up over the rounded corner of the plate, and when the arm is up the weight of the hook end of dog causes it to drop into the hole $a$ in the plate, made to receive it, and there it catches and holds the arm in position.

To let the arms down it is only necessary to press down on the lever end O of the dog, which throws the hook out of position, and the arm will fall.

These driers may be used in whole or part circle, in the yard or in the house, on a post or fastened to a wall.

I know that a drier with a plate and radial arms is not new; but a drier with arms supported by a dog is believed to be novel.

Therefore, what I claim as my invention, and desire to secure by Letters Patent, is—

1. In a clothes-drier, the dogs $f$, attached to the arms D, and made to catch in the openings $a$ in the plate A, substantially as and for the purpose specified.

2. The combination of the plate A, having openings $a$, with the dogs $f$, pivoted to the arm-sockets E, and wire $e$, substantially as and for the purpose set forth.

JOSEPH R. RUSBY.

Witnesses:
 HORACE HARRIS,
 A. L. CROSS.